United States Patent
Actis-Datta

(10) Patent No.: US 9,676,671 B2
(45) Date of Patent: Jun. 13, 2017

(54) METHOD FOR FABRICATING A COLOURED, ZIRCONIA-BASED ARTICLE; IN PARTICULAR AN ORANGE COLOURED ARTICLE; AND A COLOURED, ZIRCONIA-BASED ARTICLE OBTAINED ACCORDING TO THE METHOD

(71) Applicant: Comadur S.A., Le Locle (CH)

(72) Inventor: Arnaud Actis-Datta, Sion (CH)

(73) Assignee: Comadur S.A., Le Locle (CH)

(*) Notice: Subject to any disclaimer, the term of this patent is extended or adjusted under 35 U.S.C. 154(b) by 0 days.

(21) Appl. No.: 14/888,558

(22) PCT Filed: May 5, 2014

(86) PCT No.: PCT/EP2014/059073
§ 371 (c)(1),
(2) Date: Nov. 2, 2015

(87) PCT Pub. No.: WO2014/177714
PCT Pub. Date: Nov. 6, 2014

(65) Prior Publication Data
US 2016/0060176 A1 Mar. 3, 2016

(30) Foreign Application Priority Data
May 3, 2013 (EP) ..................................... 13166502

(51) Int. Cl.
| C04B 35/486 | (2006.01) |
| C04B 35/48 | (2006.01) |
| C04B 35/626 | (2006.01) |
| C04B 35/63 | (2006.01) |
| C04B 35/64 | (2006.01) |

(52) U.S. Cl.
CPC ............ *C04B 35/48* (2013.01); *C04B 35/481* (2013.01); *C04B 35/486* (2013.01); *C04B 35/62695* (2013.01); *C04B 35/63* (2013.01); *C04B 35/64* (2013.01); *C04B 2235/3203* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3229* (2013.01); *C04B 2235/3246* (2013.01); *C04B 2235/3418* (2013.01); *C04B 2235/36* (2013.01); *C04B 2235/5445* (2013.01); *C04B 2235/6567* (2013.01); *C04B 2235/6584* (2013.01); *C04B 2235/664* (2013.01); *C04B 2235/80* (2013.01); *C04B 2235/9661* (2013.01)

(58) Field of Classification Search
CPC ...... C04B 35/48; C04B 35/486; C04B 35/488
See application file for complete search history.

(56) References Cited

U.S. PATENT DOCUMENTS

| 6,200,916 | B1 | 3/2001 | Michel et al. | |
| 9,126,870 | B2* | 9/2015 | Nahas | C04B 35/486 |
| 2006/0099552 | A1 | 5/2006 | van der Zel et al. | |
| 2010/0032622 | A1 | 2/2010 | Naum et al. | |
| 2011/0309302 | A1 | 12/2011 | Vishnyakov et al. | |
| 2012/0121859 | A1* | 5/2012 | Nahas | C04B 35/486 428/148 |
| 2013/0217562 | A1* | 8/2013 | Yamauchi | C04B 35/486 501/86 |
| 2013/0284065 | A1 | 10/2013 | Nahas | |
| 2015/0252260 | A1* | 9/2015 | Berner | C09K 11/7792 428/209 |

FOREIGN PATENT DOCUMENTS

| EP | 0 947 486 | | 10/1999 |
| EP | 1 396 237 | | 3/2004 |
| JP | 2011020872 | * | 2/2011 |
| WO | 2012 085875 | | 6/2012 |

OTHER PUBLICATIONS

International Search Report Issued Jun. 10, 2014 in PCT/EP14/059073 Filed May 5, 2014.

* cited by examiner

*Primary Examiner* — Karl Group
(74) *Attorney, Agent, or Firm* — Oblon, McClelland, Maier & Neustadt, L.L.P.

(57) ABSTRACT

The invention concerns a method for fabricating an orange, zirconia-based article, characterized in that it includes the series of steps consisting in creating a first mixture comprising a zirconia powder, 3 to 20% by weight of at least one stabilizer chosen from the group of oxides comprising yttrium oxide, magnesium oxide, and calcium oxide, alone or in combination, 0.1% to 5% by weight of at least one element intended to form a vitreous phase, and chosen from the group comprising silicon oxide, aluminum oxide, lithium oxide and yttrium oxide, alone or in combination, 1% to 6% by weight of a cerium oxide powder; creating a second mixture including said first mixture and a binder; creating a granulated mixture by granulating said second mixture; forming a green body by giving said second granulated mixture the shape of the desired article; air sintering for at least thirty minutes at a temperature comprised between 1,250 and 1,500° C. and annealing the desired article at a temperature comprised between 700° C. and 1,350° C. for a period comprised between 30 minutes and 20 hours in a reducing atmosphere, and polishing said sintered green body.

11 Claims, No Drawings

METHOD FOR FABRICATING A COLOURED, ZIRCONIA-BASED ARTICLE; IN PARTICULAR AN ORANGE COLOURED ARTICLE; AND A COLOURED, ZIRCONIA-BASED ARTICLE OBTAINED ACCORDING TO THE METHOD

CROSS REFERENCE TO RELATED APPLICATIONS

This is a National Phase Application in the United States of International Patent Application PCT/EP2014/059073 filed May 5, 2015, which claims priority to European Patent Application No. 13166502.8 filed May 3, 2013.

The invention concerns a method for fabricating a coloured, zirconia-based article, in particular such an article exhibiting a colour comprised in the range from bright orange to coppery brown and achieved by means of sintering. Such an article will be referred to as an "orange article" in the following description for reasons of convenience.

The invention also concerns a decorative, zirconia-based, orange article notably obtained according to the method set out below.

It is already known to incorporate colouring agents or pigments, such as cadmium sulphide (CdSe), cadmium selenide and cadmium sulfoselenide, in ceramic materials to obtain orange/red ceramic articles used, for example, to create enamels, glazes and containers for domestic use or flooring.

The use of this type of colouring agents has numerous drawbacks as soon it is desired to incorporate this type of colouring agent in industrial ceramics particularly sintered zirconia-based ceramics.

Indeed, these colouring agents are unstable at high temperatures and only exhibit their colouring characteristics up to 1,000 to 2,000° C. This greatly limits the use of this type of colouring agents and, in particular, does not allow for the creation of sintered zirconia articles, since the sintering temperatures of zirconia are in any case higher than 1,000° C.

Further, the use of this type of colouring agents, which contain heavy metals, in objects intended to be in contact with a user's skin, such as a watch case, if not prohibited by law is at least strongly discouraged.

Further, commercially available colouring agents of this type have a large grain size that is incompatible with obtaining a homogenous mixture with zirconia powder.

It is therefore the main object of the invention to provide, on the one hand, a method for fabricating a bright orange, sintered zirconia-based article and, on the other hand, such an article obtained according to this method, this article having satisfactory mechanical properties while exhibiting a bright orange colour over a depth of at least 5 mm from the surface.

To this end, the invention concerns a method for fabricating a bright orange zirconia-based article, characterized in that it includes the series of steps consisting in:
creating a first mixture including:
  a zirconia powder,
  3 to 20% by weight of at least one stabilizer chosen from the group of oxides comprising yttrium oxide, magnesium oxide, and calcium oxide, alone or in combination,
  0.1% to 5% by weight of at least one element intended to create a vitreous phase, and chosen from the group comprising silicon oxide, aluminium oxide, lithium oxide and yttrium oxide, alone or in combination,
  1% to 6% by weight of a cerium oxide powder;
creating a second mixture including said first mixture and a binder,
creating a granulated mixture by granulating said second mixture;
forming a green body by giving the second granulated mixture the shape of the desired article;
air-sintering for at least 30 minutes at a temperature comprised between 1,250 and 1,500° C. and,
annealing the desired article at a temperature comprised between 700° C. and 1,350° C. for a period comprised between 30 minutes and 20 hours in a reducing atmosphere with partial oxygen pressure of between $10^{-6}$ and $10^{-1}$ atmospheres, and
polishing said sintered green body.

The method of the invention makes it possible to reduce sintering temperatures by incorporating cerium oxide powder (CeO2) in the mixture to be sintered. The cerium oxide also acts as one of the determining elements of the orange colour required to be given to the article.

Indeed, the colour of the article after the sintering operation in the presence of CeO2 is ivory white. Then during a subsequent step of the method of the invention, called the annealing step, advantage is taken of the presence of $CeO_2$, (+4 oxidation state) to reduce it into $Ce_2O_3$ (+3 oxidation state). After this annealing step, the article has a colour in the range from yellow-orange to bright orange depending on the respective quantities of cerium in the +4 and +3 oxidation states present at the grain boundaries. The colour of cerium oxide ($CeO_2$) in the +4 oxidation state is ivory white and the colour of cerium oxide ($Ce_2O_3$) in the +3 oxidation state is bright orange.

The respective quantities of cerium oxides in the +4 and +3 oxidation states present at the grain boundaries are determined by the annealing conditions, more specifically by varying the partial oxygen pressure in the environment of the oven where the annealing occurs.

According to one embodiment, the first mixture includes between 0.1 and 1% by weight of oxide powders for the vitreous phase and preferably between 4 and 5% by weight of cerium oxide powder ($Ce^{+4}$ O2).

The invention also concerns a decorative, bright orange, zirconia-based article obtained according to the method described above, characterized in that it is formed of a sintered part made from a moulded part essentially including a matrix of zirconia, 3 to 20% by weight of at least one stabilizer chosen from the group of oxides comprising yttrium oxide, magnesium oxide, and calcium oxide, alone or in combination, 0.1% to 5% by weight of a vitreous phase, including at least one element chosen from the group comprising silicon oxide, aluminium oxide, lithium oxide and yttrium oxide, alone or in combination and 1% to 6% by weight of cerium oxide.

Such articles have the advantage of exhibiting an intense gloss after polishing and are thus particularly suited for making decorative articles such as the constituent parts of watch cases, jewellery, bracelets, brooches, tie pins, necklaces, handbags, telephones, furniture, or household utensils.

Other features and advantages of the invention will become apparent in light of the following description of an example implementation of the method of the invention.

The fabrication method of the invention that will now be described in detail is one that allows the creation of a bright orange, sintered zirconia-based article, whose appearance and mechanical properties are particularly suitable for making constituent parts of wristwatches or for making any other decorative articles.

The bright orange zirconia article obtained according to this method includes 89% to 98.9% by weight of stabilised zirconia and the remainder by weight, that is to say 0.1% to 5% by weight of a vitreous phase formed of silicon oxide, aluminium oxide, yttrium oxide and lithium oxide, alone or in combination, and from 1% to 6% by weight of cerium oxide.

The zirconia is conventionally stabilized in tetragonal phase by at least one stabilizer chosen from the group of oxides comprising yttrium oxide, magnesium oxide, and calcium oxide, alone or in combination, this stabilizer being in an amount of 3% to 20% by weight with respect to the zirconia.

To make this article, according to an example implementation of the method of the invention, one proceeds as follows:

943 g of stabilised zirconium powder with 3% by weight of yttrium oxide is weighed. The powder used has a mean grain size on the order of a micrometer, typically from 0.1 to 0.5 micrometers. This powder is sold under the reference TZ-3 Y by the Tosoh Corporation, Japan.

7 g of a mixture of silicon oxide, aluminium oxide and lithium oxide powder is then weighed, intended to form a vitreous phase during subsequent sintering.

Preferably, the vitreous phase includes in descending order by weight a mixture or a combination of silicon oxide, aluminium oxide and lithium oxide, respectively 47% 40% and 13%.

The silicon powder used has a mean grain size of less than one micrometer, typically 40 nanometers, and is sold under the name Aerosil OX50 by Cerdec, Germany.

The aluminium powder used has a mean grain size on the order of a micrometer or sub-micrometer, typically 0.5 micrometers and is sold under the name CR30 by Baikowski, France.

The lithium powder used has a mean grain size on the order of a micrometer or sub-micrometer, typically 2.4 micrometers and is sold under the reference no. 374725 by Sigma-Aldrich Chemicals, Switzerland. If necessary, the powder is milled to achieve the desired grain size.

Finally 50 g of cerium oxide ($Ce^{4+}$ O) is weighed; the powder used has a grain size on the order of a micrometer or sub-micrometer, typically 0.5 micrometers and is sold under the reference no. 202975 by Sigma-Aldrich Chemicals, Switzerland.

It will be noted that these powders should preferably all have a purity of more than 95%.

Once the powders have been weighed, all of said powders are mixed and homogenised in a wet medium. In the final phase of homogenisation, approximately 50 g of a binder is added, for example a polyvinyl alcohol.

The mixture is then dried, for example in a conventional atomiser.

The granule thus obtained is sieved to keep particles having a grain size of less than 200 micrometers.

The sieved granule is then pressed into a mould having the shape of the article one wishes to obtain in order to form a green body thereof.

The article in its almost final general shape is placed in a sintering furnace. It will be noted in this regard that the sintering can be carried out in air. The article is then heated in a first phase at a speed of 30° per hour to approximately 1,000° C., then in a second phase at a speed of 50° per hour to a temperature of 1,250° C. The article is maintained at this temperature for at least 30 minutes and preferably for one hour.

It will be noted that the sintering can of course be carried out at any other temperature higher than or equal to 1,100° and lower than 1,600° C.

During sintering, the silicon oxide, aluminium oxide, yttrium oxide and lithium oxide form a vitreous phase which is concentrated with the cerium oxide in the +4 oxidation state at the grain boundaries, which gives the article an ivory colour after sintering.

It will be noted that the presence of the lithium oxide advantageously lowers the sintering temperature and limits the transformation of the cerium oxide colour allowing a bright orange colour to be obtained.

After this sintering step, the article is placed in an annealing furnace in which it is possible to choose the atmosphere. The desired article is annealed either in a hydrogen atmosphere ($H_2$), or in an atmosphere comprising a mixture of nitrogen and hydrogen ($N_2/H_2$) or a mixture of argon and hydrogen.

During this annealing operation, the partial oxygen pressure in the furnace is comprised between $10^{-6}$ and $10^{-1}$ atmospheres, the annealing temperature is comprised between 700° C. and 1250° C. and the annealing time is generally comprised between 30 minutes and 20 hours.

According to a preferred implementation of the method of the invention, the atmosphere in the annealing furnace is hydrogen, the partial oxygen pressure is comprised between $10^{-4}$ and $10^{-1}$ atmospheres, the annealing temperature is comprised between 900 and 1,150° C. and the annealing time is comprised between 4 and 6 hours. It will be understood that the depth of colour inside the article varies proportionally with the annealing time.

The colour of the article obtained after the annealing operation is bright orange or a shade of colour comprised between orange and coppery brown depending on the annealing conditions.

The article is then cooled and machined to obtain a shape suited to its final use. It will be noted that the colouring is deep inside the article, so that machining the article in no way alters its colour.

Finally, the article is polished, for example, using a diamond paste, the article thus obtained has a glossy appearance that is bright orange or a shade comprised between the aforecited colours according to the annealing conditions, so that it has attractive and interesting aesthetic features, particularly for applications in the field of watchmaking.

According to another example implementation of the method of the invention, the operating method described above is followed to create circular watch bezels that are 45 mm in diameter and 4 mm thick. This example used a combination of $SiO_2$ (47%), $Al_2O_3$ (40%), and $Li_2O$ (13%) forming a compound whose proportion by weight of the total composition is 0.7%, the mixture forming the vitreous phase, 6% by weight of $CeO_2$, and the remainder, i.e. 93.3% by weight of stabilized $ZrO_2$. Once configured in their desired final shape, the bezels were sintered in air for 2 hours at 1,450° C. These bezels were then annealed for 12 hours at 1,000° C. in an atmosphere comprising 5% hydrogen and 95% argon. The bezels were then cooled and mirror polished. The bezels obtained had a bright orange glossy appearance. It was also observed, after breaking a bezel, that the colouring was achieved deep into the article.

The invention claimed is:
1. A method for fabricating a bright orange zirconia-based article, the method comprising:
preparing a first mixture comprising, at weight percentages relative to the total weight of the first mixture:
a zirconia powder,

3% to 20% of at least one stabilizer selected from the group consisting of yttrium oxide, magnesium oxide, calcium oxide, and a combination thereof, 0.1% to 5% of at least one element intended to create a vitreous phase selected from the group consisting of silicon oxide, aluminium oxide, lithium oxide, and a combination thereof, and 1% to 6% of a cerium oxide powder;

preparing a second mixture comprising the first mixture and a binder;

preparing a granulated mixture by granulating the second mixture;

forming a green body by shaping the granulated mixture;

air-sintering the green body for at least 30 minutes at a temperature of 1,250° C. to 1,500° C. to form a sintered green body and, annealing the sintered green body at a temperature of 700° C. to 1,350° C. for 30 minutes to 20 hours in a reducing atmosphere; and polishing the sintered green body.

2. The method according to claim 1, wherein the first mixture further comprises 0.1% to 1% of a powder intended to create a vitreous phase.

3. The method according to claim 1, wherein the powder intended to form a vitreous phase comprises, in an order of descending amounts in weight percentages relative to the total weight of the powder, silicon oxide, aluminium oxide, and lithium oxide.

4. The method according to claim 3, wherein the powder intended to form a vitreous phase comprises 47% silicon oxide, 40% aluminium oxide and 13% lithium oxide.

5. The method according to claim 1, wherein the first mixture comprises 4% to 5% of the cerium oxide powder.

6. The method according to claim 1, wherein the stabilizer is yttrium oxide.

7. The method according to claim 1, wherein the sintered green body is annealed at a temperature of 700° C. to 1,350° C. in a reducing atmosphere having a partial oxygen pressure to $10^{-6}$ to $10^{-1}$ atmospheres.

8. A decorative, bright orange, zirconia-based article obtained by the method according to claim 1, wherein the article is formed of a sintered part made from a moulded part comprising:

a matrix of zirconia;

3% to 20% by weight relative to the total weight of the moulded part of at least one stabilizer selected from the group consisting of yttrium oxide, magnesium oxide, calcium oxide and a combination thereof;

0.1% to 5% by weight relative to the total weight of the moulded part of a vitreous phase selected from the group consisting of silicon oxide, aluminium oxide, lithium oxide, and a combination thereof; and 1% to 6% by weight relative to the total weight of the moulded part of cerium oxides.

9. A decorative, bright orange, zirconia-based article obtained by the method according to claim 7, wherein the article is formed of a sintered part made from a moulded part comprising:

a matrix of zirconia;

3% to 20% by weight relative to the total weight of the moulded part of at least one stabilizer selected from the group consisting of yttrium oxide, magnesium oxide, calcium oxide and a combination thereof;

0.1% to 5% by weight relative to the total weight of the moulded part of a vitreous phase selected from the group consisting of silicon oxide, aluminium oxide, lithium oxide, and a combination thereof; and 1% to 6% by weight relative to the total weight of the moulded part of cerium oxides.

10. The method according to claim 2, wherein the powder intended to form a vitreous phase comprises, in an order of descending amounts in weight percentages relative to the total weight of the powder, silicon oxide, aluminium oxide, and lithium oxide.

11. The method according to claim 10, wherein the powder intended to form a vitreous phase comprises 47% silicon oxide, 40% aluminium oxide and 13% lithium oxide.

* * * * *